United States Patent [19]

McLaughlin et al.

[11] Patent Number: 5,136,498
[45] Date of Patent: Aug. 4, 1992

[54] METHOD FOR ENACTING FAILOVER OF A 1:1 REDUNDANT PAIR OF SLAVE PROCESSORS

[75] Inventors: Paul F. McLaughlin, Hatfield; Robert W. Bristow, Hatboro; Karl T. Kummer, Doylestown, all of Pa.

[73] Assignee: Honeywell Inc., Minneapolis, Minn.

[21] Appl. No.: 588,385

[22] Filed: Sep. 26, 1990

[51] Int. Cl.$^5$ .............................................. G06F 11/20
[52] U.S. Cl. ................................... 364/184; 364/187; 364/132; 371/9.1
[58] Field of Search ............... 364/184, 185, 186, 187, 364/130–137; 371/9.1

[56] References Cited

U.S. PATENT DOCUMENTS

| 4,745,542 | 5/1988 | Baba et al. | 364/184 |
| 4,933,833 | 6/1990 | Petroff | 364/184 |
| 4,958,270 | 9/1990 | McLaughlin et al. | 364/187 |
| 4,959,768 | 9/1990 | Gerhart | 364/187 |
| 5,008,805 | 4/1991 | Fiebig et al. | 364/184 |
| 5,088,021 | 2/1992 | McLaughlin et al. | 364/187 |

Primary Examiner—Jerry Smith
Assistant Examiner—Thomas E. Brown
Attorney, Agent, or Firm—Arthur A. Sapelli; Donald Lenkszus; William Udseth

[57] ABSTRACT

A primary slave IOP, upon detecting an error, verifies the availability of a secondary slave IOP, and then sets an output control signal to indicate backup is requested. The primary slave IOP then takes itself out of being the primary. A secondary slave IOP, sensing that the output control signal from the other IOP has been set, assumes the roll of the primary slave IOP. A master controller, detecting an error with the primary slave IOP, interrogates the primary and secondary slave IOPs for a status input, and then arbitrates between the first and second IOP to determine the IOP that is to take on the primary role. Finally the master controller awards the more operational IOP the role of the primary slave IOP, thereby completing the failover operation.

9 Claims, 10 Drawing Sheets

METHOD FOR ENACTING FAILOVER OF A 1:1 REDUNDANT PAIR OF SLAVE PROCESSORS

RELATED PATENT APPLICATIONS

The present application is related to U.S. patent application, Ser. No. 07/588,386, entitled "Universal Scheme of Input/Output Redundancy in a Process Control System" by Paul McLaughlin et. al., and to U.S. patent application Ser. No. 07/588,387 entitled "Fault Detection in Relay Drive Circuits," by Karl T. Kummer et. al., both applications being filed on even date herewith, and assigned to Honeywell Inc., the assignee of the present application.

BACKGROUND OF THE INVENTION

The present invention relates to a method of exchanging primary and secondary roles of a redundant pair of processors, and more particularly, to a method of enacting failover wherein the secondary processor, of a redundant pair of processors operating in a primary and secondary role, can detect and enact a failover (ie, exchange) when the primary processor has failed.

Process Control Systems with backup process controllers such as described and claimed in U.S. Pat. No. 4,133,027, issued to J. A. Hogan on Jan. 2, 1979, and U.S. Pat. No. 4,141,066, issued to Y. Keiles on Feb. 20, 1979, include a backup controller having a dedicated Random Access Memory (RAM) and a dedicated Read-Only Memory (ROM). The backup controller is essentially idle or can be doing some background tasks, but not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

Existing systems, such as that described in U.S. patent application, Ser. No. 07/299,859, filed on Jan. 23, 1989, and assigned to Honeywell Inc., the assignee of the present application, provide for a 1:1 redundancy system, whereby the data base of a secondary device (i.e., secondary or backup controller) is updated periodically such that the updating process is transparent to the primary functions and does not tie-up (or penalize) CPU or processor performance and utilizes a minimum amount of time. When a failover condition occurs, there is a period of time when no communications can take place (i.e., an outage) between the primary controller and the remainder of the system. Further, the primary and secondary controllers are in a predefined location, and the software utilized for implementing this redundancy feature (i.e., redundancy software) is not transparent to other layers of software above the redundancy software. For example, if a Universal Station of a plant control network were to interrogate a controller (i.e., a primary controller since the secondary controller cannot be interrogated), of a process controller of a process control system, for a value, during failover the controller is unable to respond and the universal station outputs question marks on the display to the operator.

The present invention provides a method wherein the primary and secondary processors of a redundant pair of processors can exchange roles without resynchronizing (ie, recopying) the data base from the primary processor to the secondary processor, and permits the secondary processor to exercise the control function of a primary processor immediately without any delay (for initialization, updating data bases, ...) In the preferred embodiment the system in which the present invention can be found, the primary and secondary processors cannot initiate communications between each other on a communication network. In the present invention, the processors utilize control lines to a common output circuit to indicate status information between the processors. Further, the processor failover is transparent with respect to data access to all data users of the master node, including external nodes that communicate with the master, in which the primary and secondary processor are included.

SUMMARY OF THE INVENTION

Thus there is provided by the present invention, a method of exchanging primary and secondary roles of a redundant pair of processors. In a process control system, a master controller is operatively connected to a communication link, and at least one pair of slave input-/output processors (IOPs) is each operatively connected to the communication link. A first IOP of the pair is a primary slave IOP and a second IOP of the pair is a secondary slave IOP. The first and second IOP each have a first and second data base, respectively, the first and second IOP each executing the same tasks utilizing a first and second clocking system, respectively. Communications by the master controller are made only to the first IOP, including communications which modify the first data base. The first and second IOPs are unable to communicate with each other. The first and second IOPs are each operatively connected to an output switching device such that control of the output switch device is coordinated between the first and second IOP. Each of the first and second IOP can sense a state of an output control signal from the other IOP to the output switching device. A method for accomplishing a failover comprises the following steps. The primary slave IOP, upon detecting an error, verifies the availability of a secondary slave IOP, and then sets the output control signal to indicate backup is being requested. The primary slave IOP then takes itself out of being the primary slave IOP. (For conditions that cause the primary to cease operation, hardware asserts the backup request.) The secondary slave IOP, sensing that the output control signal from the other IOP of the pair of IOPs has been set indicating that the primary slave IOP has detected an internal fault, assumes the role of the primary slave IOP. The master controller, detecting an error with the primary slave IOP on the first message to the primary following primary failure, interrogates the primary and secondary slave IOPs for a status input. The master controller then arbitrates between the first and second IOP to determine the IOP that is to take on the primary role. Finally, the master controller awards the more operational IOP the role of the primary slave IOP, thereby completing the failover operation.

Accordingly, it is an object of the present invention to provide a method of enacting failover.

It is another object of the present invention to provide a method for enacting failover of a primary and secondary processor of a redundant pair of processors.

It is still another object of the present invention to provide a method of enacting failover wherein the secondary processor, of a redundant pair of processors operating in a primary and secondary role, can detect and enact the failover when the primary processor has failed.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 9, which comprises

DETAILED DESCRIPTION

Figure 1:
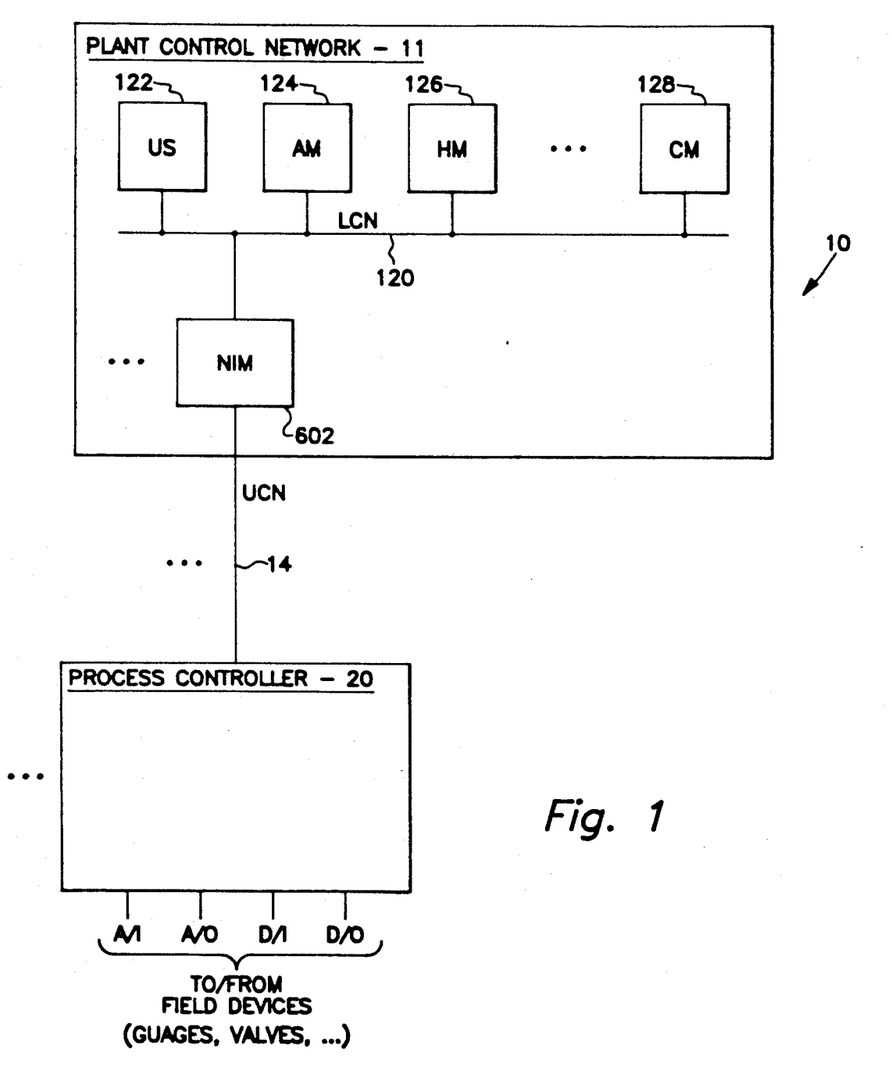
FIG. 1 shows a block diagram of a process control system in which the present invention can be utilized.

Before describing the method of the present invention, it will be helpful in understanding a system environment in which the present invention can be utilized. Referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
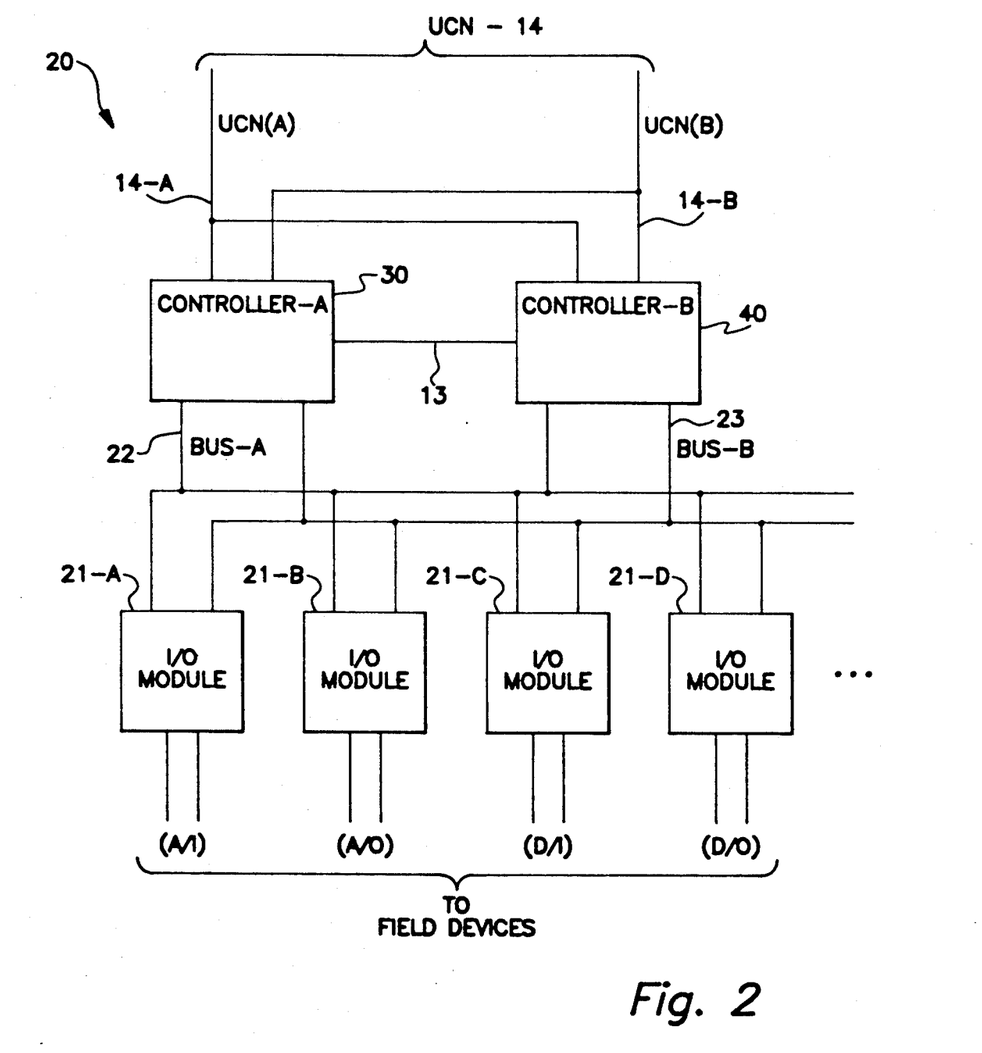
FIG. 2 shows a block diagram of a process controller, including I/O modules (IOP), in which the present invention can be utilized.

Referring to FIG. 2 there is shown a block diagram of the process controller 20. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus B 23. In addition, once again for communication redundancy purposes, controller A 30 is also connected to bus B 23 and controller B 40 is connected to bus A 22.

Controller A and controller B, 30, 40, can communicate with each other via three mediums, the UCN 14, a link 13 between the controllers, and the buses A, B, 22, 23, with bus A and bus B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20.

Figure 3:
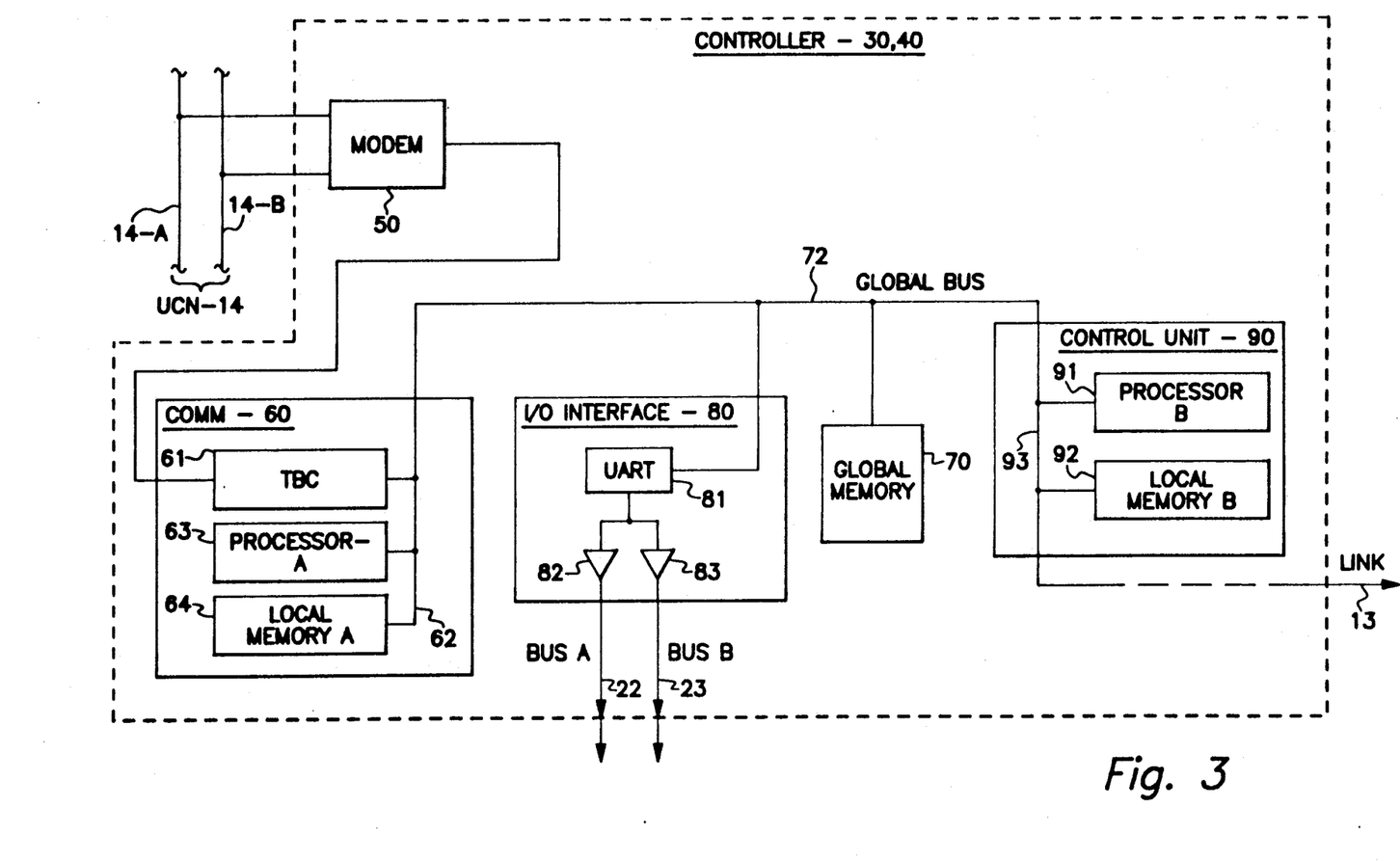
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the plant control network 11 via modem 50 and TBC 61. The local memory A 64 stores information, including personality image which is downloaded from the plant control network 11, for use by processor A 63 and TBC 61. The global memory 70 stores information which is common to both processor A 63 and a processor B 91. It also stores all the data received from bus A 22 and bus B 23. The global memory 70 also serves as an interprocessor communication vehicle between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20. A more detailed description of the track unit can be had by making reference to patent applications:

(a) patent application Ser. No. 07/299,857, entitled "APPARATUS FOR TRACKING PREDETERMINED DATA FOR UPDATING A SECONDARY DATA BASE," by P. Gerhart, filed on Jan. 23, 1989; and (b) patent application Ser. No. 07/299,859, entitled "METHOD FOR CONTROL DATA BASE UPDATING OF A REDUNDANT PROCESSOR IN A PROCESS CONTROL SYSTEM," by P. McLaughlin et al, filed on Jan. 23, 1989; both of the above-identified applications assigned to Honeywell Inc., the assignee of the present application. The I/O interface unit 80 includes a receiver-transmitter device, this device being a UART (Universal Asynchronous Receiver/Transmitter) 81. The UART 81 is coupled through drivers 82, 83 to bus A 22 and bus B 23, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
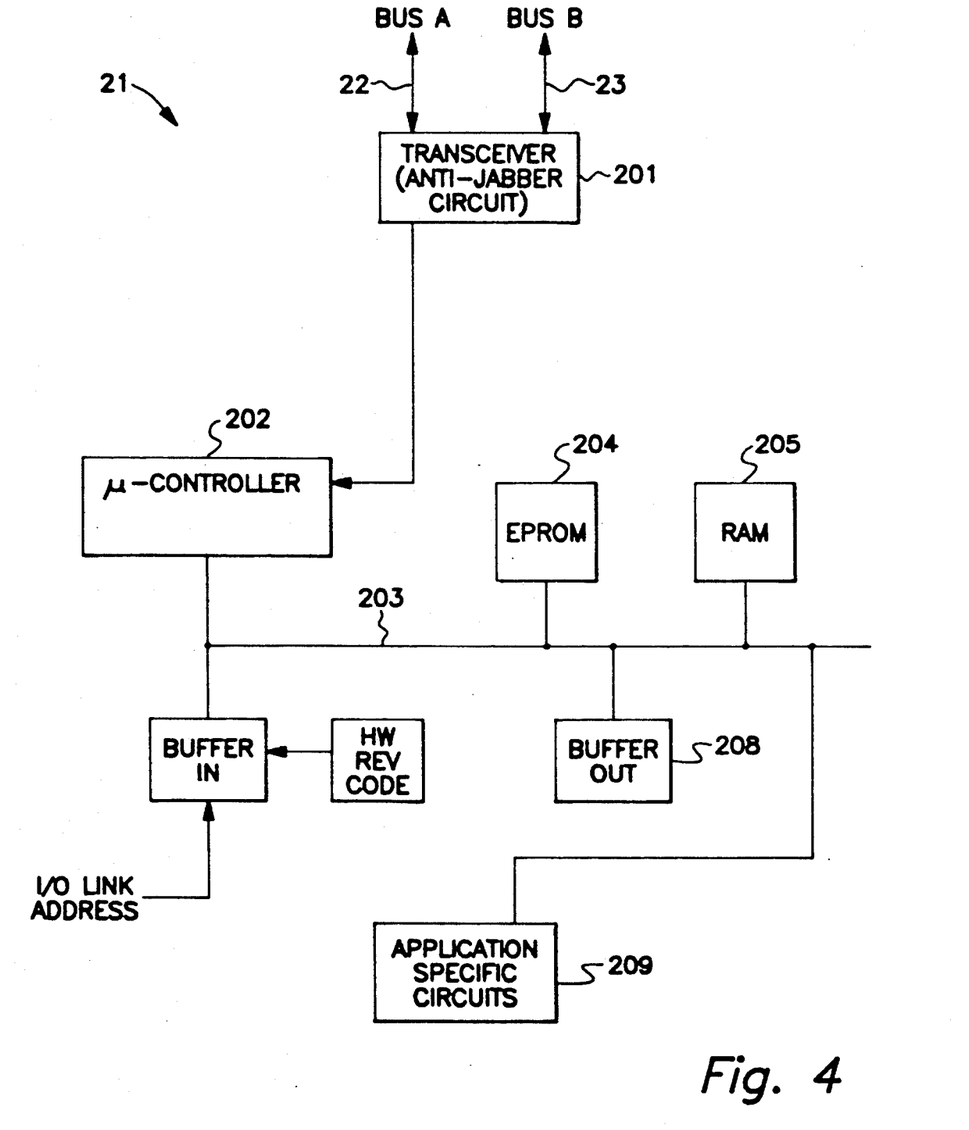
FIG. 4 shows a block diagram of an I/O module which is included in the process controller of FIG. 2.

Referring to FIG. 4 there is shown a block diagram of an I/O module. A transceiver (anti-jabber circuit) 201 interfaces with bus A 22 and bus B 23. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also connected to the local bus 203. The RAM 205 contains the information which forms the database for the I/O module 21. The EPROM 204 contains the program information utilized by the microcontroller 202. Also attached to local bus 203 is an input buffer which receives the I/O link address information from the I/O link (bus A, bus B, 22, 23). The output buffer (BUFFER OUT) 208 is connected to the local bus 203. The application specific circuits 209 are also connected to the local bus 203 and interfaces with the input and output buffers 206, 208, and the microcontroller 202 via the local bus 203. The application specific circuits 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . . ) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined format having predetermined scale (i.e., engineering units, normalized units, percent of scale, . . . ) In the preferred embodiment seven types of applications specific circuits are provided for, these include a high level analog input, low level analog input, analog output, digital input, digital output, smart transmitter interface, and pulse input counter.

Figure 5:
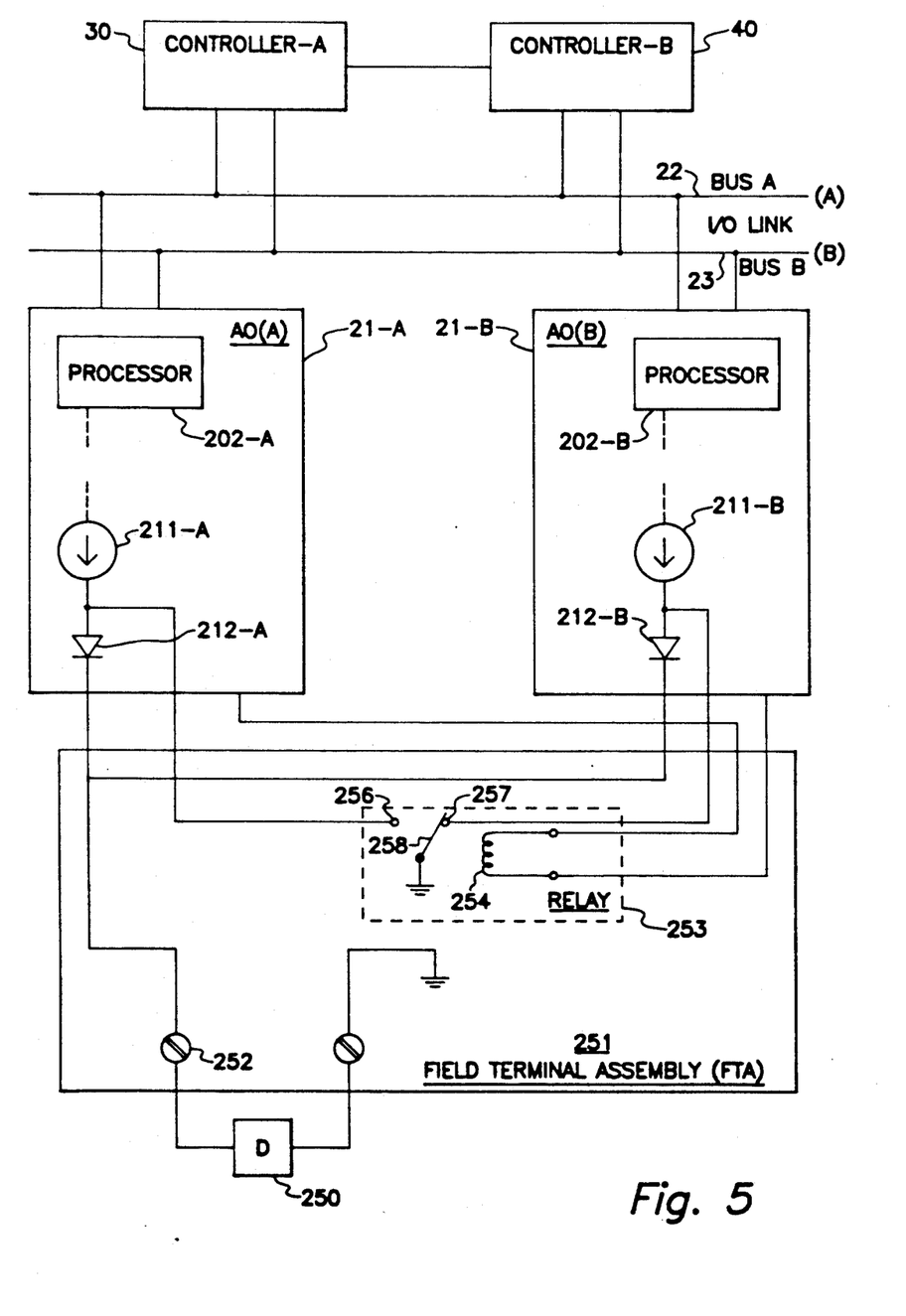
FIG. 5 shows a block diagram of the redundancy scheme of the I/O module within the process controller 20 of FIG. 2.

Referring to FIG. 5, there is shown a functional block diagram of a field terminal assembly (FTA) 251 utilized to implement the redundancy scheme of the I/O modules 21 within the process controller 20. As described above, the process controller 20 includes controller A 30 and controller B 40 connected to the I/O link 22, 23. Also connected to the I/O link 22, 23 are the I/O modules 21 (also referred to herein as input/output processor IOP). In the redundancy scheme of the IOPs as utilized in the preferred embodiment of the process controller 20, the analog output type I/O module 21 is duplicated, shown in FIG. 5 as AO(A) 21-A and AO(B) 21-B. (Other I/O module are connected to the I/O link 22, 23 as discussed above, but are not shown here for simplicity.) Each IOP includes a processor 202-A, 202-B, as described above. IOP AO(A) and IOP AO(B) are both connected to a field device (D) 250, through a field terminal assembly (FTA) 251, the field device being a valve, thermocouple, . . . Both IOPs, AO(A) 21-A and AO(B) 21-B are performing the same tasks and outputting the same information (presuming no errors in either IOP) to the FTA 251. However, the output from only one IOP is actually coupled to the field device 250, as will now be discussed.

One IOP is designated the main or primary IOP and the other is designated the backup or redundant IOP. Here, IOP AO(A) 21-A is designated the main IOP interfacing with field device 250, and IOP AO(B) 21-B is designated the redundant IOP. Both IOPs are outputting the same information from a corresponding current source 211-A, 211-B. The output information is coupled to a common point 252 (a terminal sometimes referred to as the customer screw), through a corresponding diode 212-A, 212-B. A common point between the current source 211-A and diode 212-A of AO(A) 21-A is coupled to a first contact point 256 of a relay 253 and a common point between current source 211-B and diode 212-B of AO(B) 21-B is coupled to a second contact point 257 of relay 253. The arm 258 of relay 253 is connected to a ground point and is also normally switched (i.e. no current through the coil 254), to the second contact point of the relay 253, such that the output of the second current source 211-B of AO(B) 21-B is shorted to ground. In this manner only the output information from AO(A) 21-A is coupled to the field device 250. In the event of a failure of AO(A) 21-A, the relay 253 switches such that the output from AO(A) 21-A is shorted to ground and the output from the redundant IOP AO(B) 21-B is immediately coupled to the customer screw 252, and thus to the field device 250. The switching of relay 253 is initiated by activating a coil 254 of relay 253.

One terminal of relay coil 254 is connected to AO(A) 21-A and the other terminal of relay coil 254 is connected to AO(B) 21-B. Normally, the relay is switched (no current through coil 254) such that IOP(A) is communicating with the field device 250 and IOP(B) is in the backup mode (i.e., the IOP(B) output is shorted to ground by the relay 253.) When an error is detected by the controller 30, the controller A 30 (or controller B 40 if it is functioning as the primary controller) initiates a command to the IOPs to switch the relay 253. The IOPs, IOP(A) and IOP(B) can also affect the switch over if they detect an error, and will be described hereinunder.

Figure 6:
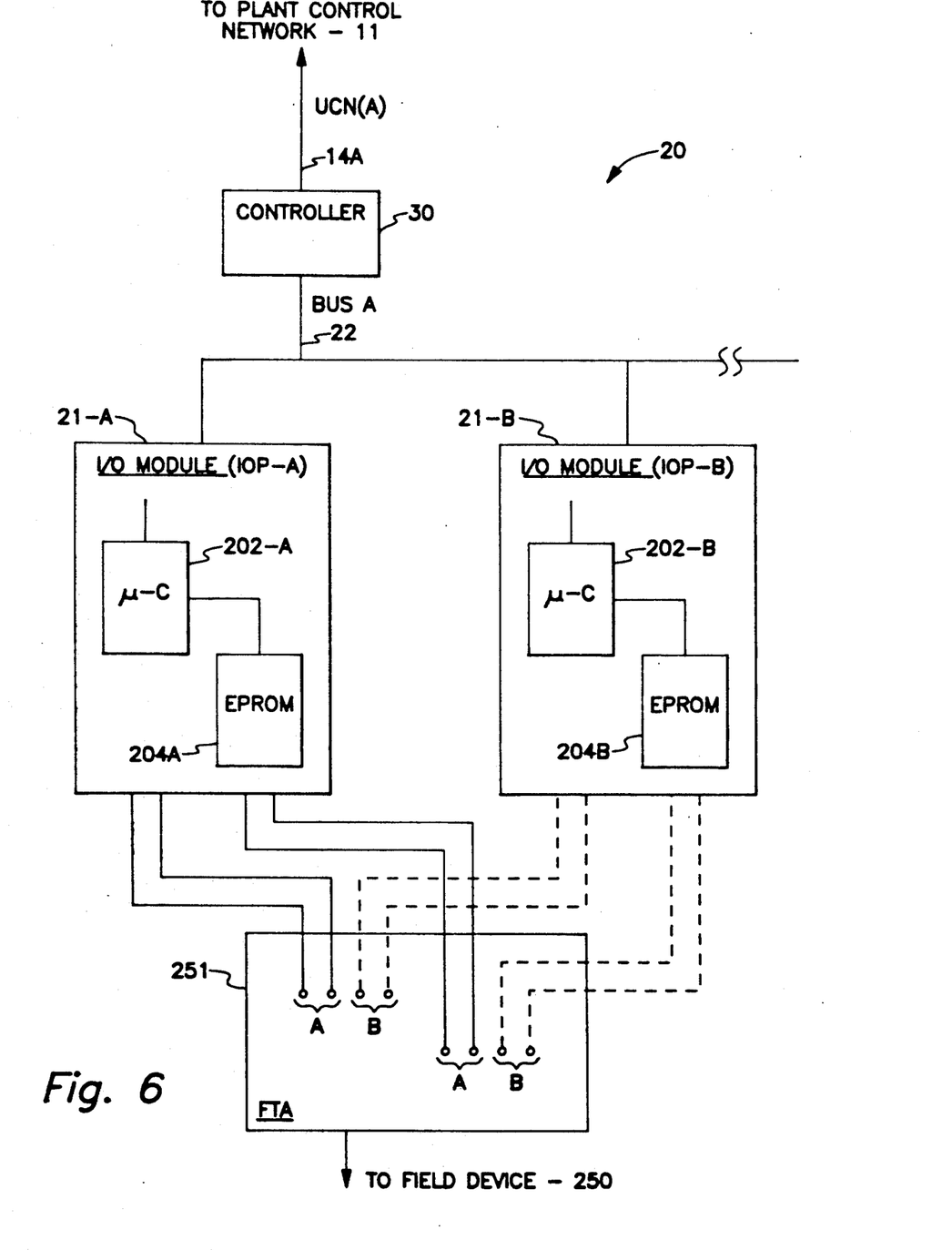
FIG. 6 shows a simplified block diagram of the process controller of FIG. 2.

The IOP redundancy will now be described. Referring to FIG. 6, there is shown a simplified block diagram of the process controller 20 of FIG. 2, having the redundancy of the controller omitted, and having an IOP and a backup IOP, only, for purposes of example. In the preferred embodiment, up to forty (40) IOPs can be included, and any mix of IOP types can be included in a redundant or non-redundant configuration. As will be recognized by those skilled in the art from the description above, the controller 30 performs as the master processor, the IOP module 21-A as the primary slave processor, and the IOP module 21-B as the backup (or secondary or redundant) slave processor.

For example purposes only, assume that the process controller 20 has controller 30 operating as the primary controller and I/O module 21-A (an analog output module) configured a module 1 in accordance with configuration rules of the process control system. IOP A 21-A is always present (assuming the requirement for an A/O IOP) and IOP B 21-B is optional (and initially assume it is not configured. Thus IOP B is shown in dotted lines in FIG. 6.) For example purposes, assume IOP(A) is placed in file address 3 and card address 8. (In the preferred embodiment of the system, the cabinet is divided in files (rows) and card slots.) Thus in this example the "printed circuit card" of an A/O IOP which is designated as IOP(A) 21-A is inserted in row 3, card slot 8. IOP(A) is given a logical address and assume that in this example is assigned logical address number 1. The controller 30 data base includes the data for an IOP connected to BUS-A 22 logical address 1, physical address of IOP(A) of file 3, card 8, and is initially non-redundant. (See State 1 of Table 1.) The controller 30 communicates to the primary slave IOP via the configured logical address. The process control system 10 is powered up and initialized along with the process controller 20, including controller 30 and IOP(A) 21-A, and running normally. IOP(A) 21-A is connected to the "A" points of FTA 251.

TABLE 1

| CONTROLLER 30 DATA BASE | | State 1 Initial, Non-Redundant | State 2 Initial | State 3 Normal |
|---|---|---|---|---|
| Logical Address | | 1 | 1 | 1 |
| Physical Address A | File (rack, row, . . . ) | 3 | 3 | 3 |
| | Card (slot within file) | 8 | 8 | 8 |
| Physical Address B | File | 0 | 4 | 4 |
| | Card | 0 | 10 | 10 |
| Redundant | (Yes or No) | N | Y | Y |
| Synchronized | (Yes or No) | N | N | Y |
| Primary | (A or B) | A | A | A |

At some later time, the backup slave IOP 21-B can be added while the system 10 is running. IOP(A) 21-A continues to run normally and IOP(B) 21-B is configured in any spare location in the file (cabinet, row, . . . ) IOP(B) is connected to the "B" terminals of FTA 251, and in accordance with the configuration rules of the system, information is outputted (from the universal station US 122 of the plant control network 11) relating to the IOP(B), including the location information and the fact that IOP(B) is the backup to module 1 (i.e., the module having logical address 1). That information is transmitted to controller 3 during normal operations of the system 10 and the controller data base is updated (reference state 2 of Table 1, assume IOP(B) 21-B has been located in file 4, card slot 10). It will be recognized by those skilled in the art that many techniques are available for the manual inputting of such information from a operator input terminal and will not be discussed further herein since it is not necessary for understanding the redundancy scheme of the present system.

The controller 30 then acts to synchronize the IOP(B) 21-B in accordance with the method of the present invention. Synchronizing is the process whereby the same data base is contained in both IOP(A) 21-A and IOP(B) 21-B. The information of the data base of IOP(A) is requested by the controller 30. IOP(B) 21-B eavesdrops on the transmissions of data from IOP(A) 21-A to the controller 30 and stores the information in its data base memory, thereby causing the data base of IOP(B) 21-B to be the same, whereupon IOP(B) is commanded to start executing. IOP(B) performs the same operations as IOP(A) and outputs the same information to the FTA 251 at essentially the same time (however, each IOP is operating using its own clock). It will be recognized that IOP(B) 21-B is a dedicated backup. The operation of FTA 251, however, permits only IOP(A) or IOP(B) to reach the field device 250, as described above. Once IOP(B) is synchronized, the controller data base is updated as shown in state 3 of Table 1.

Figure 7:
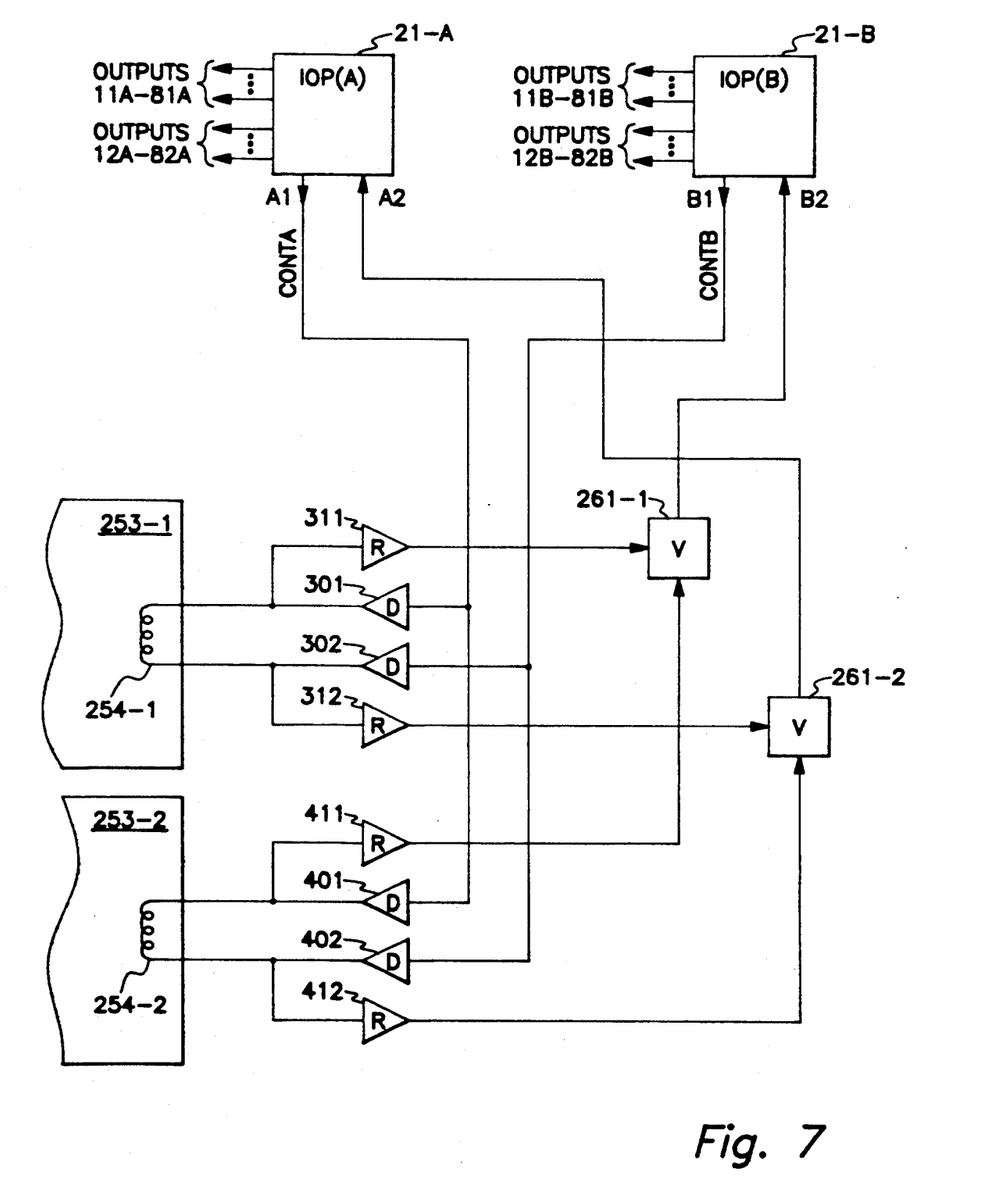
FIG. 7 shows a block diagram of the circuit utilized for controlling the relay switch circuit.

Referring to FIG. 7, there is shown a block diagram of the circuit utilized for controlling (and testing) the relay switch circuit. (A complete description of the testing operation can be had by referring to the related application "Fault Detection in Relay Drive Circuits" identified above.) The relay coil 254-1 is connected to drivers 301, 302, and to a second relay coil 254-2. (It will be understood by those skilled in the art that the relay circuit 253 of FIG. 5 can have multiple sets of contacts and a number of relay coils controlling a predetermined number of contacts. The preferred embodiment of the relay 253 utilizes 8 sets of contacts total, a first set of 4 contacts being controlled by a first coil 254-1, and a second set of 4 contacts being controlled by a second coil 254-2.) Driver 301 for the first relay coil 254-1 and driver 401 for the second relay coil 254-2 are both connected to an output terminal A1 of IOP(A). Driver 302 for the first relay coil 254-1 and driver 402 for the second relay coil 254-2 are both connected to an output terminal B1 of IOP(B). The output terminal A1 from IOP(A) delivers a signal CONTA to the respective drivers and output terminal B1 from IOP(B) delivers a signal CONTB to the respective drivers, the signals used for control of the relay switch circuit (and for testing as described in the related patent application identified above.) Each IOP indirectly provides an indication of the present state to the other IOP via these control lines. The relay coils are also connected to receiver circuits, relay coil 254-1 being connected to receiver circuits 311, 312, and relay coil 254-2 being connected to receiver circuit 411, 412. The receiver circuit 311 from the first relay coil and the output of the receiver circuit 411 from the second relay coil is coupled to a first voting circuit (V)261-1, and the output of receiver circuit 312 from the first relay coil and the output of receiver 412 from the second relay coil are coupled to a second voting circuit (V)261-2. The output of the first voting circuit is coupled to an input terminal B2 of IOP(B) and the output of the second voting circuit 261-2 is coupled to a terminal A2 of IOP(A).

In the control mode, the CONTA and CONTB signals are "back-up request" signals. Normally, the output signals are low indicating the IOPs are operating normally. When a failure is detected by the IOP, the corresponding signal is raise high (or true) indicating a request for backup, or that the IOP is not available for backup. The IOPs periodically sense the A2 or B2 input to determine the status of the redundant IOP. The voting circuit 261 is such that there is a degree of memory or hysteresis inherent in the circuit such that the output remains the same until both inputs have been switched.

Figure 8:
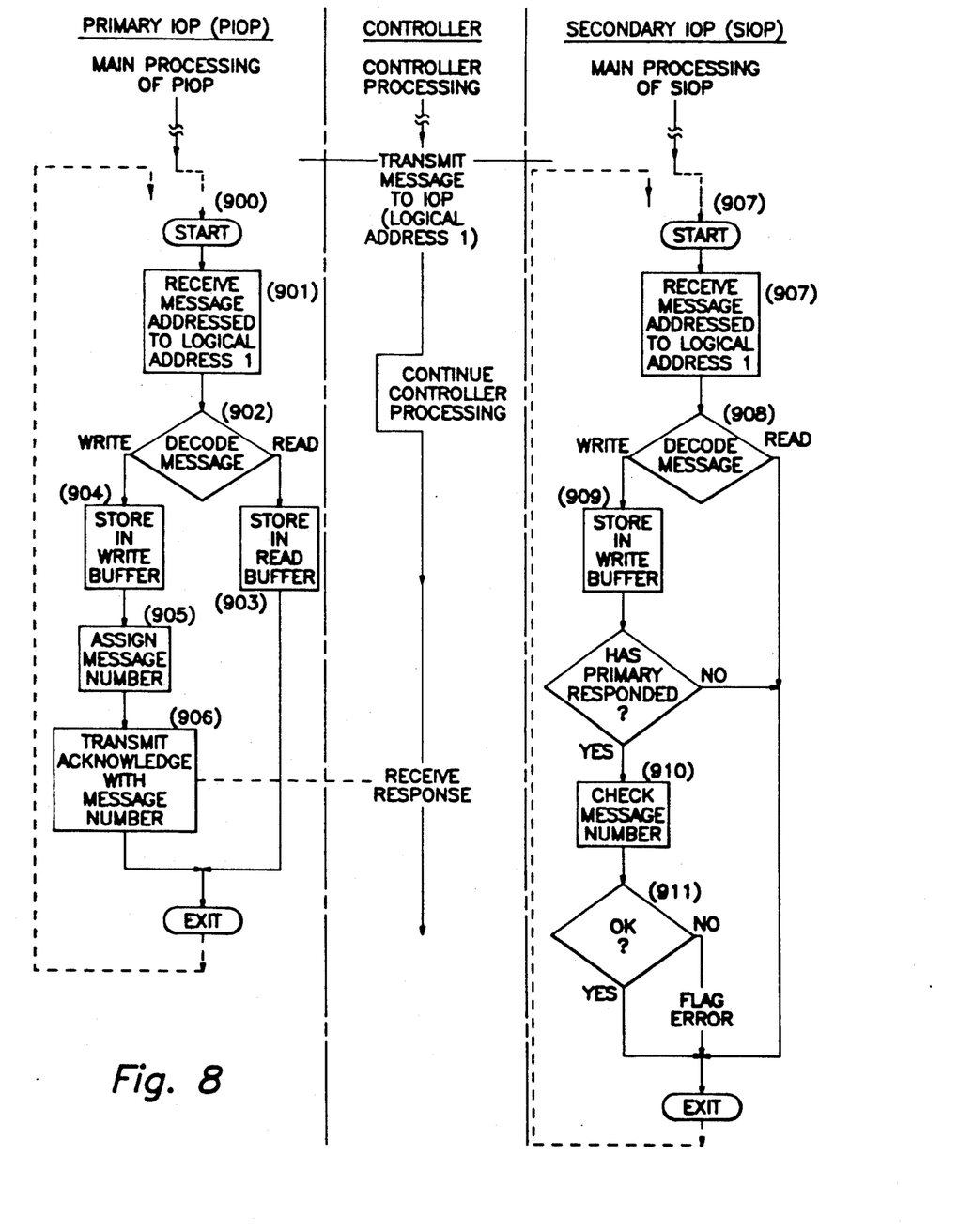
FIG. 8 shows a flow diagram of the communications scheme between the controller and the primary and secondary IOPs.

Referring to FIG. 8, there is shown a flow diagram of the communications scheme between the controller and the primary and secondary IOPs. In normal operation, all transfers (i.e., writes) to the IOP(A) 21-A from controller 30 are also received by IOP(B). IOP(B) eavesdrops on the communications since both IOP(A) and IOP(B) have a logical address of one in this example and the controller 30 communicates to the primary IOP by logical address. The controller is performing its main processing, the primary IOP is performing its main processing, and the secondary IOP is performing its main processing, which is the same as the primary IOP, but is running ahead or behind since each IOP is running off its own clock (this assumes initialization of the secondary IOP has been completed and is synchronized). At some point in time the controller transmits a message to IOP having a logical address of one. Both the primary IOP 21-A and the secondary IOP 21-B receive the message. The controller then continues with its main processing. However, the primary IOP breaks off from its main processing to accept the message received (block 900). The message addressed to logical address one is received (block 901) and the message is decoded (block 902). If a read message has been detected, the message is stored in a read buffer for subsequent reading of the requested data in the primary data base for subsequent transmittal to the controller (block 903). If a write message has been decoded the message is stored in a write buffer (block 904) and assigned a message number (block 905). An acknowledge message is then transmitted by the primary IOP (block 906) to the controller along with the message number assigned. The acknowledge message indicates to the controller that the message has been received and the message number indicates to the controller the message number assigned so that subsequent interrogations by the controller as to the status of the particular message request can be made by message number. (In this description write requests from the controller mean any changes to the data base.) Subsequent inquiries by the controller regarding the status of a message having a specific message number will result in a status return of in progress along with the message number. When the requested action is completed, which would normally take place during the main processing of the primary IOP, the status is updated to a complete status such that when a status request is made by the controller a complete status may be indicated. In the present embodiment, the completed status has three unique classes which include okay, warning, and failure. In this particular situation the failure means the action has not been taken because of some error (e.g., the point is not active, . . . ), and warning meaning that the action has taken place but the data has been modified (e.g. a request to open a valve 102% may be modified by the primary IOP to open the valve only 100%, . . . )

The secondary IOP also receives the transmitted message having a logical address one, since the secondary IOP is aware of its primary partner's logical address. The secondary IOP breaks off from its main processing to accept the message (block 907). The received message is decoded (block 908) and if a read message has been detected the processing terminates and exits back to the main processing of the secondary IOP. If a write message has been detected, the message is stored in a write buffer (block 909) and after the primary has responded, the message number transmitted by the primary IOP to the controller in the acknowledge message is checked (block 910). If the primary fails to respond, the secondary ignores the message and exits. The message numbers are assigned sequentially so the secondary IOP has knowledge of the next message number to be allocated by the primary IOP (block 910). Also, during initial synchronization, the secondary IOP is made aware of the primary's current message number. If the message number checks out okay (block 911), the message processing routine of the secondary IOP exits and returns back to the main processing of the secondary IOP (block 911). If the message number is not the message number expected, an error is flagged for subsequently notifying the controller that an error, i.e. an incorrect message number, has been detected and that the secondary IOP is no longer in sync with the primary IOP. The secondary IOP in its main processing works on the same data as the primary IOP (assuming the message number check passed) but may occur at different times but in the same order. The secondary IOP, since it is running on its own clock, can be ahead or behind in its processing as compared to the main processing of the primary IOP.

Figure 9A:
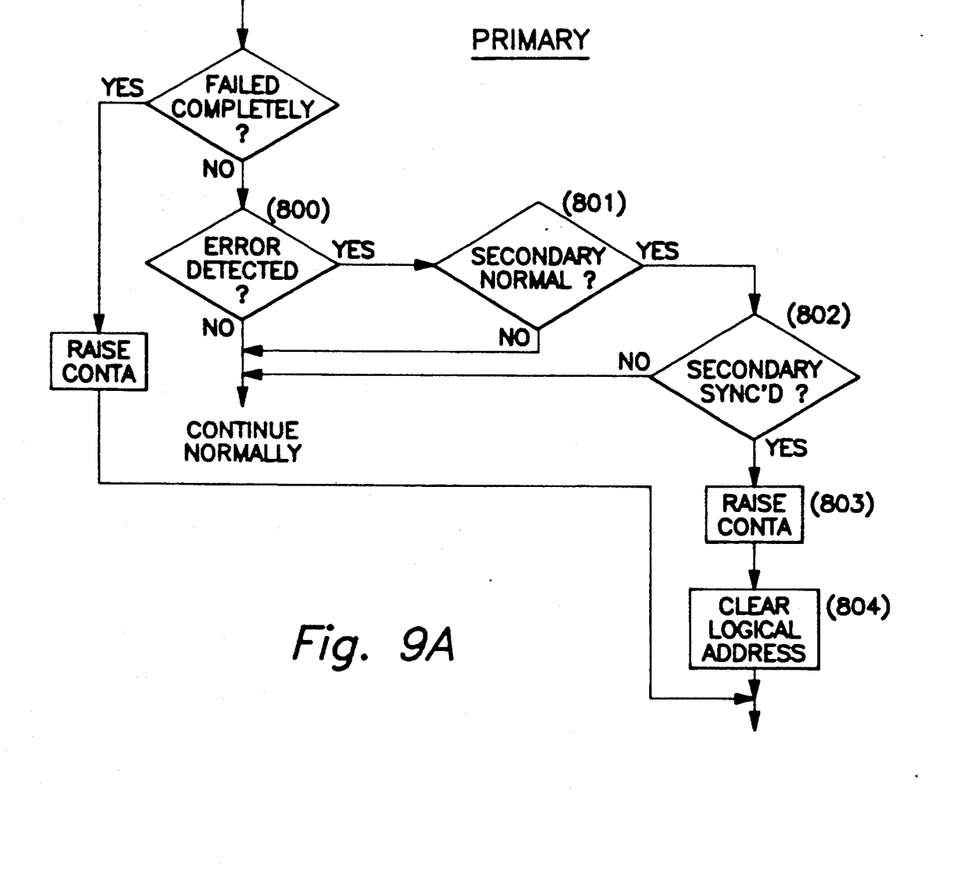
FIG. 9A-9C, shows a flow diagram of the failover operation of the method of the present invention.
Figure 9B:
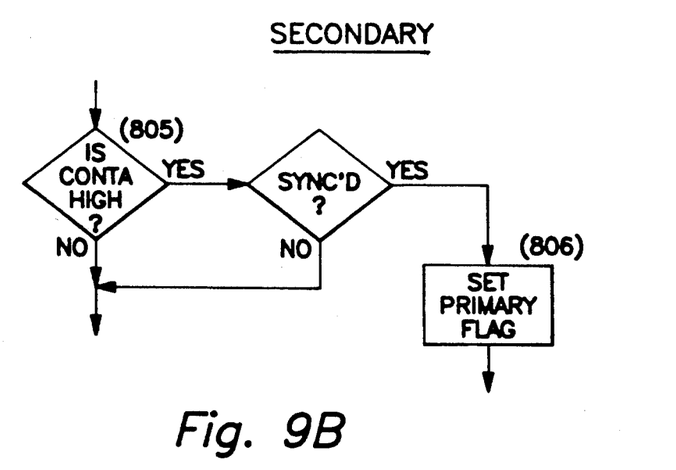
Figure 9C:
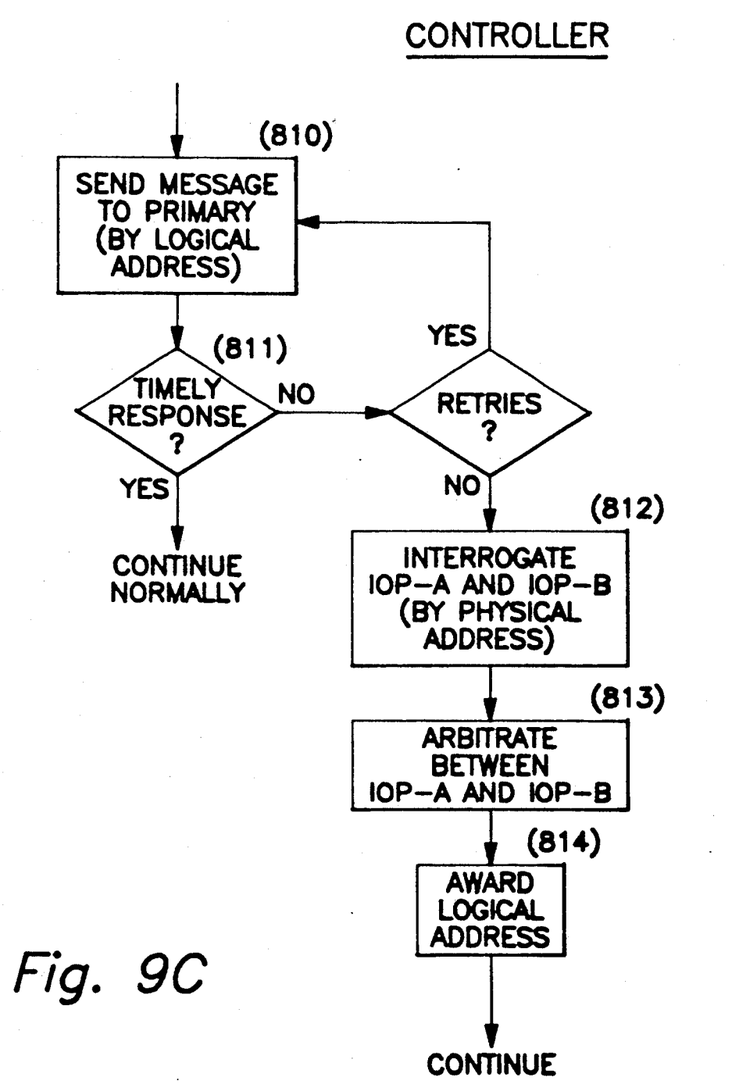

Referring to FIG. 9, which comprises FIGS. 9A-9C, a flow diagram of the failover operation of the method of the present invention is shown.

As discussed above, the primary and secondary IOPs 21-A, 21-B cannot communicate with each other via BUS A-22. Normally, with the secondary operational and synchronized, the signals CONTA and CONTB outputted from the primary and secondary IOP to the FTA 251 are low (or false), the primary IOP indicating a normal condition and the secondary IOP indicating it is available for backup. When the primary IOP detects an error (as a result of running a diagnostic by some failure of some operational checks) (block 800), the primary IOP then checks the A2 input from the voting circuit 261 to determine the status of the secondary IOP 21-B (block 801). The primary verifies that the secondary is synchronized (block 802), and then the primary initiates failover by raising the backup request signal CONTA (block 803) and clears the logical address in its data base (block 804). IOP-A continues to operate as a secondary. (The primary may just fail (i.e., cease to operate), in which case, hardware asserts the backup request, and is detected by the secondary. In this case, the primary does not become a secondary.)

The secondary IOP 21-B periodically checks the B2 input from the voting circuit 261 to determine the status of the primary IOP (block 805). If the secondary detects the backup request signal from IOP-A is true (indicating IOP-A wants to be backed-up), the secondary IOP-B performs its part in the failover process by setting a primary flag in its data base, thereby accepting the role of primary and operates as the primary IOP (block 806).

The controller 30, on its next transmission (read or write) to the primary IOP (block 810), checks for a response from the primary IOP (IOP-A)(block 811). The communication is performed according to the method as described above, the controller 30 addressing the primary by logical address. As a result of the primary IOP having cleared the logical address as its part in the failover process (block 804, above) or if the primary has failed and cannot respond, the IOP-A does not respond to the communication. IOP B, operating as the secondary IOP never had the logical address assigned (although it knew what the logical address was, thereby permitting the eavesdropping function to occur), and thus does not respond to the communication. After a predetermined period of time without an acknowledge response and any required retries, the controller 30 interrogates IOP-A and IOP-B by physical address to determine the status of each IOP (block 812). As a result of the response thereto, the controller arbitrates between IOP-A and IOP-B to determine the IOP which is to operate as the primary (block 813). The controller 30 arbitrates based on the status response. [For example, even though IOP-A and IOP-B can both indicate some failure, one IOP can be better than the other. IOP-A can have an error in one of the eight outputs, whereas IOP-B can have an error which affects more than one output. This particular example is of a double-failure-type and the redundancy is not intended to handle double failure, but an attempt is made to handle double-failures as gracefully as possible.]In this case, IOP-B has no failures, and has accepted the primary role, and IOP-A has some error (CONTA was high) indicated in the status reply. The controller 30 will award the logical address (block 814) after the arbitration, in this case to IOP-B. The awarding of the logical address to the IOP by the controller 30 makes IOP-B the primary and permits IOP-B to respond to communications from the controller. IOP-A (has for example a partial failure) runs as the secondary, and eavesdrops on the communications as described above. As a result of the failover IOP-A is not synchronized, and the controller will later take the necessary steps to synchronize the new secondary IOP-A. The awarding of the logical address by the controller 30 completes the failover. Since the IOP-B had been operating as the secondary IOP in parallel with IOP-A prior to the failover, it can be readily understood that the failover occurred very efficiently without any loss of output communications to the field devices 250. If IOP-A ceases to operate, IOP-B runs as a primary without backup until manual action is taken to repair the failure.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. A method for accomplishing a failover in a process control system, the process control system having a master controller operatively connected to a communication link; and at least one pair of slave input/output processors IOPs), each IOP being operatively connected to the communication link wherein a first IOP of the pair is a primary slave IOP and a second IOP of the pair is a secondary slave IOP, the first and second IOP having a first and second data base, respectively, the first and second IOP each executing the same tasks utilizing a first and second clocking system, respectively, and further wherein the data bases of the first and second IOPs are synchronized, communications by the master controller being made only to the first IOP including communications which modify the first data base, the first and second IOPs being unable to communicate with each other, and further wherein the first and second IOPs are each operatively connected to an output switching device such that control of said output switch device is coordinated between said first and second IOP, and wherein each of said first and second IOP can sense a state of an output control signal from the other IOP to said output switching device, the method for accomplishing a failover, comprising the steps of:

the primary slave IOP
 a) upon detecting an error, verifying the availability of a secondary slave IOP;
 b) setting the output control signal to indicate backup is being requested;
 c) taking itself out of being the primary slave IOP;
the secondary slave IOP
 d) sensing that the output control signal from the other IOP of the pair of IOPs has been set indicating that the primary slave IOP has detected a failure;
 e) assuming the role of the primary slave IOP;
the master controller
 f) detecting an error with the primary slave IOP;
 g) interrogating the primary and secondary slave IOPs for a status input;
 h) arbitrating between the first and second IOP to determine the IOP that is to take on the primary role; and
 i) awarding the more operational IOP the role of the primary slave IOP, thereby completing the failover operation.

2. A method for accomplishing a failover, according to claim 1 wherein the step of verifying comprises:
sensing the state of the output control signal of the secondary IOP to said switching device.

3. A method of accomplishing a failover, according to claim 2, wherein the step of taking comprises:
clearing a flag internal to the IOP which is utilized internally to the IOP to indicate that it is in a primary role.

4. A method for accomplishing a failover, according to step 2, wherein the step of clearing comprises:
clearing a flag internal to the IOP which is utilized internally to the IOP to indicate that it is in a primary role, the flag including the value of the logical address assigned by the master controller to the IOP.

5. A method for accomplishing a failover, according to claim 4, wherein the step of assuming comprises:
setting a flag internal to the secondary slave IOP to indicate to the master controller that the secondary slave IOP is operational and is ready to accept the role of primary slave IOP in the failover operation.

6. A method for accomplishing a failover, according to claim 5, wherein the step of detecting comprises:
a) sending a message to the primary slave IOP; and
b) obtaining no acknowledgement response within a predetermined time.

7. A method for accomplishing failover according to claim 6, wherein the step of sending a message to the primary address comprises:
addressing the primary slave IOP by logical address.

8. A method for accomplishing failover according to claim 6, wherein the step of interrogating the primary and secondary slave IOP comprises:
transmitting a message requesting status information addressing each IOP by physical address.

9. A method for accomplishing failover according to claim 8, wherein the step of awarding comprises:
sending a message to the selected IOP from step (h) which is to be given the primary role, the message including the logical address chosen by the master controller, the logical address being partially utilized as the primary flag by the IOP.

* * * * *